United States Patent [19]

Calhoun

[11] Patent Number: 5,775,375
[45] Date of Patent: Jul. 7, 1998

[54] HYDRAULIC COUPLER DUST COVER

[75] Inventor: Norman Lee Calhoun, Cedar Falls, Iowa

[73] Assignee: Deere & Company, Moline, Ill.

[21] Appl. No.: 661,248

[22] Filed: Jun. 10, 1996

[51] Int. Cl.[6] .................................................. F16L 55/16
[52] U.S. Cl. ........................ 138/89; 138/76 R; 285/901; 220/337
[58] Field of Search ........................... 138/89, 89.1–89.4; 220/337, 339, 307, 352; 285/901

[56] References Cited

U.S. PATENT DOCUMENTS

| | | |
|---|---|---|
| 1,096,278 | 5/1914 | Sutton . |
| 1,273,896 | 7/1918 | Martin . |
| 3,653,529 | 4/1972 | Segmuller ........................ 215/41 |
| 4,262,802 | 4/1981 | Laauwe . |
| 4,711,363 | 12/1987 | Marino . |
| 4,768,668 | 9/1988 | Van Den Brink ........................ 215/305 |
| 4,817,991 | 4/1989 | Frentzel et al. . |
| 4,963,132 | 10/1990 | Gibson . |
| 5,036,889 | 8/1991 | Pherigo ........................ 138/89 |
| 5,067,624 | 11/1991 | Thanisch . |
| 5,078,296 | 1/1992 | Amidzich . |
| 5,145,646 | 9/1992 | Tyranski . |
| 5,251,770 | 10/1993 | Bartley et al. ........................ 215/305 X |
| 5,385,372 | 1/1995 | Utterberg . |
| 5,496,141 | 3/1996 | Popsys ........................ 138/89 X |
| 5,518,033 | 5/1996 | Webster ........................ 138/89 X |

OTHER PUBLICATIONS

Literature: Technical Manual TM1500, "Selective Control Valves and Couplers/Hydraulic Couplers", pp. 70–20–23, 19 Nov. 1993.

*Primary Examiner*—Patrick Brinson

[57] ABSTRACT

A dust cover includes a hollow sleeve for insertion into a connector opening and a lid pivotally coupled thereto. The lid is biased to a passive sealing position wherein the lid engages a rim portion of the sleeve, and is movable by an operator to an active sealing position wherein a part of the rim is releasably received by a recess formed on a part of the lid.

18 Claims, 5 Drawing Sheets

HYDRAULIC COUPLER DUST COVER

BACKGROUND OF THE INVENTION

The invention relates to a cap or a dust cover for covering an opening of a fluid connector.

Agricultural vehicles, such as tractors, are typically provided with hydraulic coupling ports to which may be connected hydraulic couplers so that hydraulic motors or cylinders can be powered by the tractor hydraulic system. It is important for such ports to be protected from moisture and/or contamination. It is known to insert dust covers into the ports for such purposes. One commercially available dust cover includes a hollow cylindrical flexible rubber sleeve closed at one end by a flexible diaphragm. The diaphragm has a slit through which a connector can be inserted. The edges of the slit are intended to close against each other when the connector is withdrawn. Such prior art dust covers may not completely seal the port and, over time, the slit edges may lose their "memory" and fail to close properly when the connector is withdrawn. Such dust covers also may not provide adequate protection against power washer sprayers.

SUMMARY OF THE INVENTION

Accordingly, an object of this invention is to provide a dust cover which maintains its sealing function over time.

A further object of the invention is to provide such a dust cover which provides adequate sealing protection against power washer sprayers.

Another object of the invention is to provide a dust cover which automatically performs a minimum degree of sealing function merely upon withdrawal of a coupler and which can be manually placed in a state of increased sealing function.

These and other objects are achieved by the present invention, wherein a dust cover includes a hollow rubber sleeve and a flexible lid coupled to the sleeve. The sleeve has an inner rim which forms a coupler seal and an outer rim. A sleeve attachment member projects from one side of the outer rim. The lid has a disk-shaped body which is engageable with an end of the sleeve, a lid attachment member which projects from one side of the body and which is bonded to the sleeve attachment member, a disk-shaped seal member oriented at an angle with respect to the body, and a neck which connects the seal member to the body. The body, the seal member and the neck form a recess which opens in a direction facing away from the attachment member. The lid is movable to a passive sealing position wherein the seal member engages an outer portion of the inner rim, and to an active sealing position wherein the lid is releasably latched to the sleeve member. In one embodiment, in the active position, the seal member engages an inner portion of the inner rim and a portion of the inner rim is received by the recess. The attachment members are preferably formed with a bias which urges the lid to its passive sealing position without manual intervention.

In a preferred embodiment a recess is formed in an inner surface of the sleeve member opposite the sleeve attachment member, and a part of the seal member is received by the recess when the lid is in the active sealing position.

DETAILED DESCRIPTION

Figure 1:
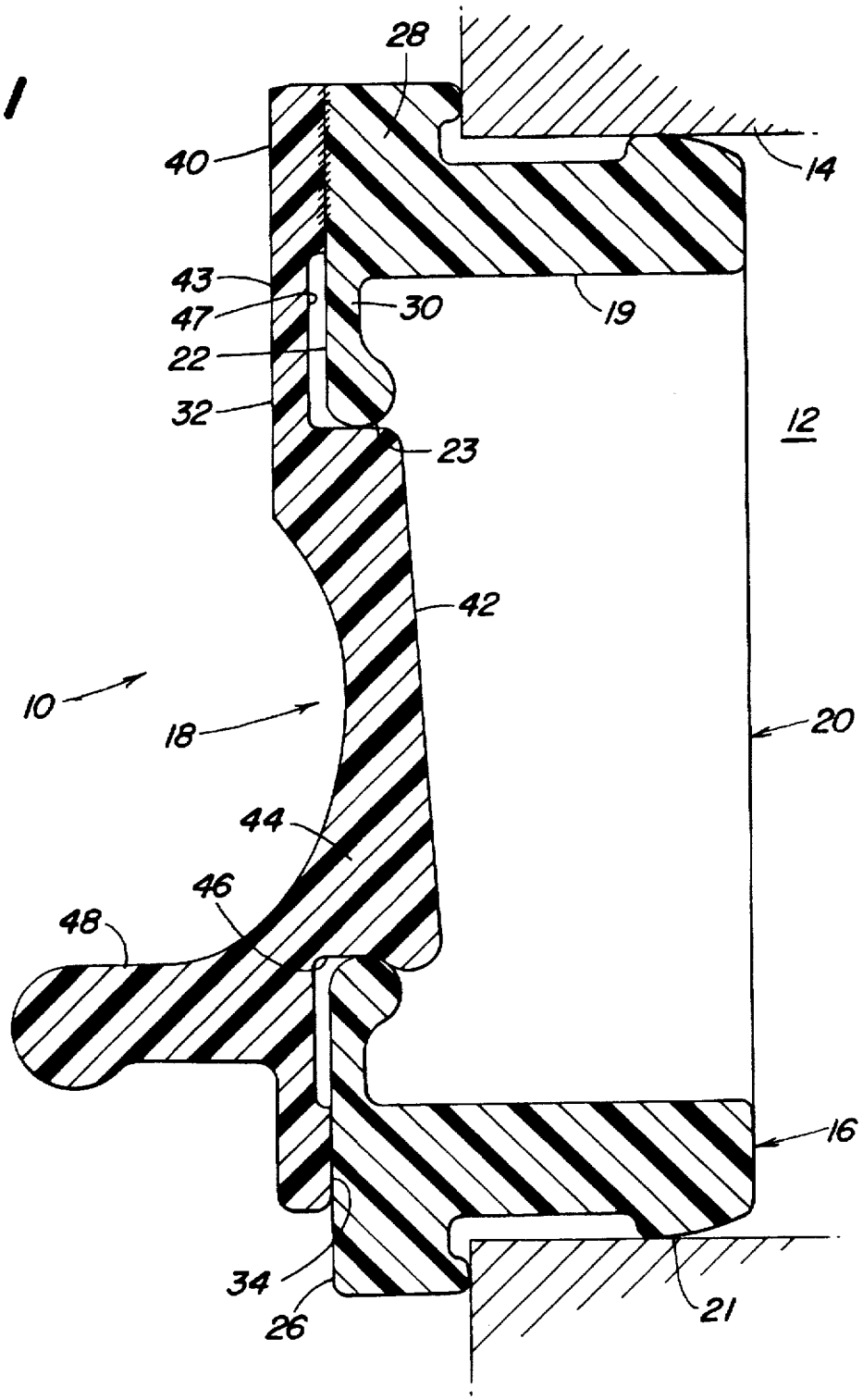
FIG. 1 is sectional view of the dust cover of the present invention in its closed or active sealing state.

Referring to FIG. 1, a dust cover or cap 10 is installed into an opening 12 of a female fluid connector 14. The cap 10 includes a sleeve portion 16 and a lid portion 18.

The sleeve portion 16 includes a hollow cylindrical tube member 20 for insertion into the connector opening 12 and which forms a cylindrical bore 19. An annular retention rib 21 projects from an outer surface of the tube 20 for sealing engagement with the wall of opening 12. An inner rim 22 projects radially inwardly from one end of the tube member 20 and an inner lip or edge 23 of the inner rim 22 forms a coupler seal for sealing engagement with a hydraulic coupler (not shown). A circular outer rim 26 projects radially outwardly from the end of the tube member 20. A sleeve attachment member 28 projects from one side of the outer rim 26. The inner rim 22 has an annular portion 30 which extends from the tube 20 to the inner lip 23. The inner lip 23 has a partially cylindrical cross-sectional shape with an outer diameter which is larger than a thickness of the annular portion 30.

Figure 3:
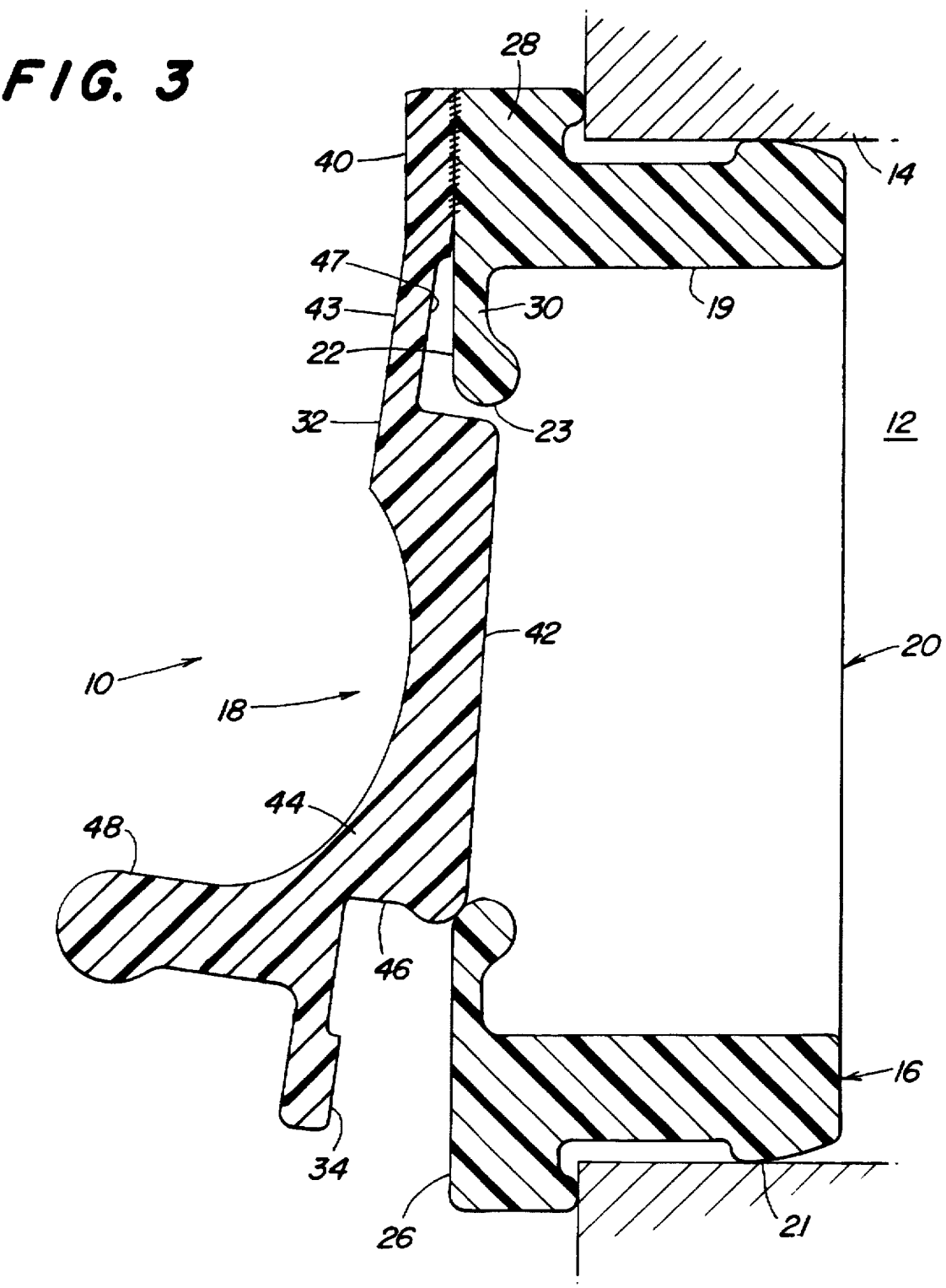
FIG. 3 is side view of the dust cover of the present invention in its passive sealing state.

The lid 18 includes a disk-shaped body 32 which forms an annular contact surface 34 which is engageable with the end 36 of the sleeve 16. The body 32 also forms concave depression 35 in an outer surface of the lid 18 in order to increase the flexibility of the lid 18. The contact surface 34 defines a plane 38. A lid attachment member 40 projects from one side of the body 30 and is bonded to the sleeve attachment member 28. A disk-shaped seal member 42 is oriented at an angle with respect to the plane 38, and a neck 44 connects the seal member 42 to the body 30. A reduced thickness flex portion 43 connects attachment member 40 to seal member 42. The body 30, the seal member 42 and the neck 44 form a recess 46 which opens in a direction facing away from the attachment member 40. The flex portion 43 is flexible so that lid 18 is movable from the active sealing position shown in FIG. 1, wherein the lid is releasably latched to the sleeve member, and wherein the seal member 42 engages a radially inwardly facing surface portion of inner lip 23 and a portion of the inner lip 23 is received by the recess 46, to a passive sealing position shown in FIG. 3, wherein the seal member 42 engages an axially outwardly facing surface portion of the inner lip 23. An annular recess 47 is formed on the disk-shaped body and on one side is joined to the lid attachment member 40. Preferably, the attachment members 28 and 40 are fixed together by bonding or vulcanizing. A handle member 48 projects away from the lid and may be grasped by an operator.

Preferably, when the lid 18 is in its passive sealing position the lid will be biased by the flexing of the flex portion 43 so that the seal members 42 will remain in engagement with the lip 23 without manual intervention.

Figure 2:
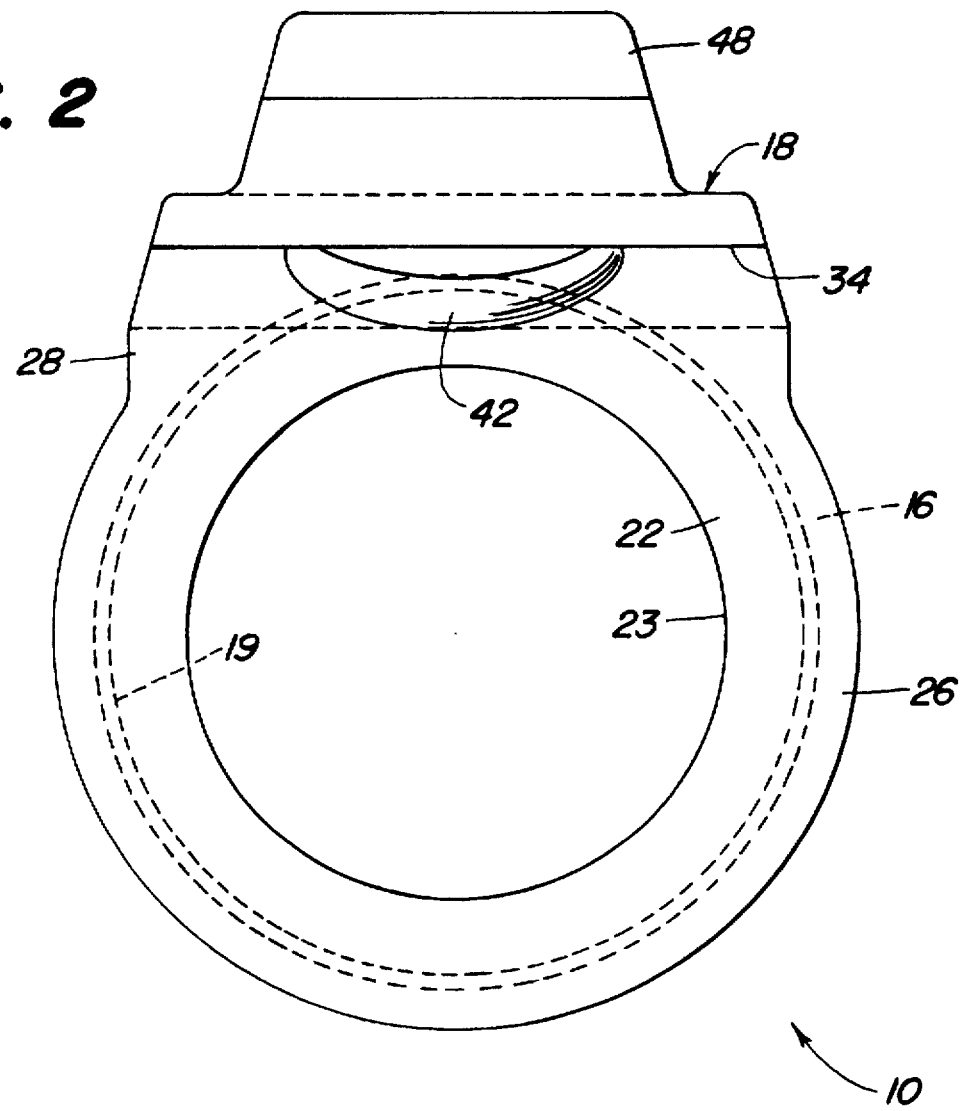
FIG. 2 is a view along a central axis of the coupler opening with the dust cover in a fully open state.
Figure 4:
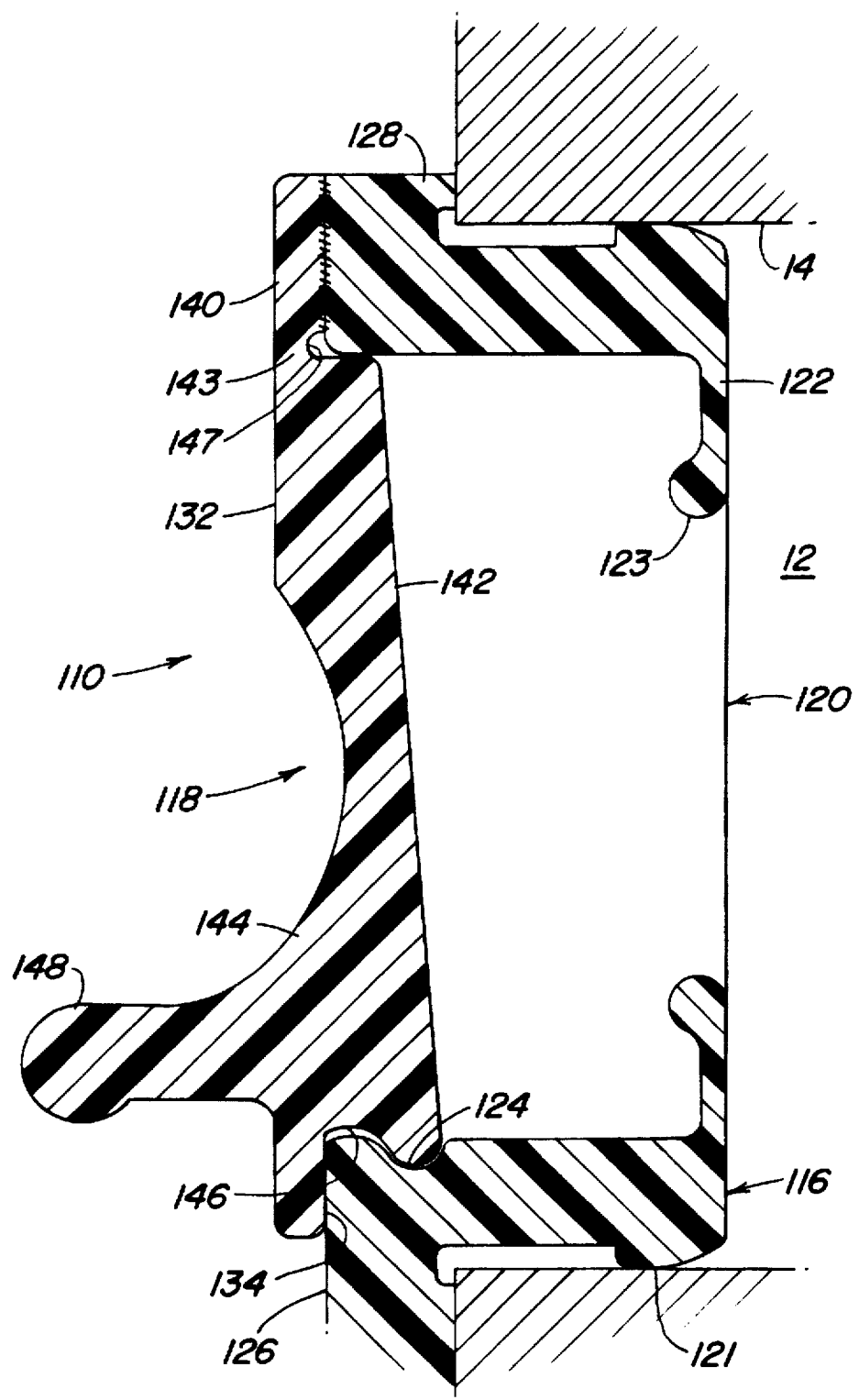
FIG. 4 is sectional view of an alternate embodiment of the present invention in its closed or active sealing state.

FIG. 4 shows an alternate, or preferred embodiment of a dust cover or cap 110 which is installed into an opening 12 of a female fluid connector 14. It is similar to the embodiment of FIGS. 1–3, except as described follows.

The sleeve portion 116 includes an annular inner rim 122 which projects radially inwardly from the axially inner end of the tube member 120 and which forms an inner lip 123 for sealing engagement with a hydraulic coupler (not shown).

The inner lip 123 has a partially cylindrical cross-sectional shape with an outer diameter which is larger than a thickness of the annular rim 122. A recess 124 is formed in the inner surface of sleeve portion 116 on the side opposite the lid attachment member 140.

Circular outer rim 126 projects radially outwardly from the end of the tube member 120. A sleeve attachment member 128 projects from one side of the outer rim 126.

Figure 5:
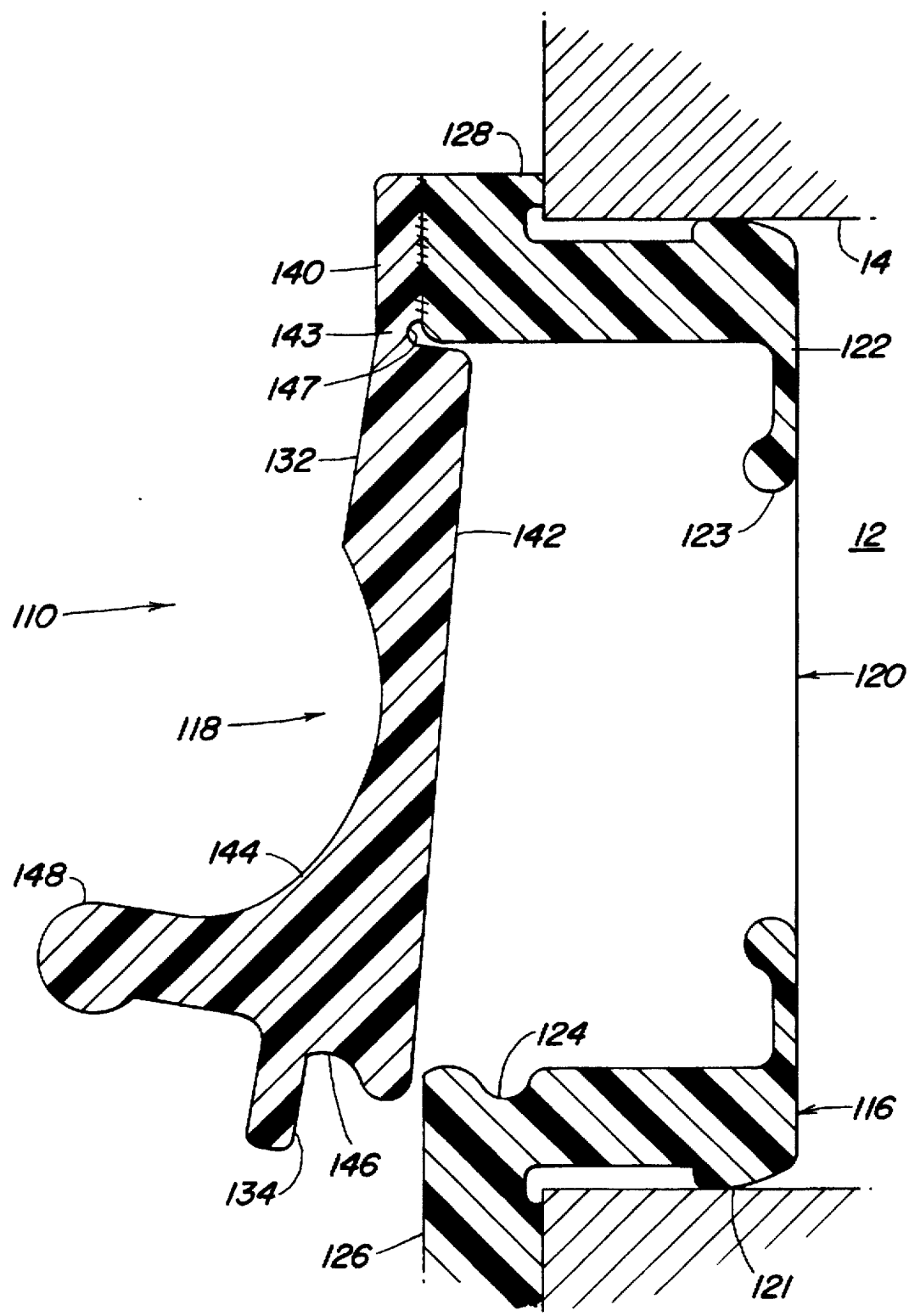
FIG. 5 is side view of the dust cover of FIG. 4 in its passive sealing state.

The lid 118 includes a disk-shaped body 132 which forms an annular contact surface 134 which is engageable with the end 136 of the sleeve 116. The body 132 also forms concave depression 135 in an outer surface of the lid 118 in order to increase the flexibility of the lid 118. The contact surface 134 defines a plane 138. The lid attachment member 140 projects from one side of the body 132 and is bonded to the sleeve attachment member 128. A disk-shaped seal member 142 is oriented at an angle with respect to the plane 138. A reduced thickness flex portion 143 connects attachment member 140 to seal member 142. The body 132 and the seal member 142 form a recess 146 which opens in a direction facing away from the attachment member 140. The flex portion 143 is flexible so that lid 118 is movable from the active sealing position shown in FIG. 1, wherein an end of the seal member 142 is received by the recess 124, to a passive sealing position shown in FIG. 5, wherein the seal member 142 engages an axially outwardly facing surface portion of outer rim 126. A recess 147 is formed on the disk-shaped body between the body 132 and the lid attachment member 140. Preferably, the attachment members 128 and 140 are fixed together by bonding or vulcanizing. A handle member 148 projects away from the lid and may be grasped by an operator.

Preferably, when the lid 118 is in its passive sealing position the lid will be biased by the flexing of the flex portion 143 so that the seal member 142 will remain in engagement with the rim 126 without manual intervention. In both embodiments the cap may also be formed of commercially available rubber material with SAE J200 requirements M6 CH510 B14 C12 F17, although other materials could also be suitable.

While the present invention has been described in conjunction with a specific embodiment, it is understood that many alternatives, modifications and variations will be apparent to those skilled in the art in light of the foregoing description. For example, the lid and sleeve parts could be formed as a single part, or as two seperate parts which bonded together as shown herein. Accordingly, this invention is intended to embrace all such alternatives, modifications and variations which fall within the spirit and scope of the appended claims.

What is claimed is:

1. A dust cover for covering an opening of a fluid connector, the dust cover comprising:
   a hollow sleeve member for insertion into the connector opening, the sleeve member having an annular rim at an outer end thereof; a flex member coupled to an outer end of the sleeve member; and
   a lid coupled to and integrally formed with the flex member, the lid being biased to a passive sealing position by the flex member wherein the lid engages the rim, and the lid being manually movable to an active sealing position wherein the lid is releasably latched to the sleeve member.

2. The dust cover of claim 1, wherein:
   the sleeve member comprises:
      an inner rim projecting radially inwardly from one end of the sleeve member, an inner edge of the inner rim forming a coupler seal,
      a circular outer rim projecting radially outwardly from said one end of the sleeve member,
      and a sleeve attachment member projecting from one side of the outer rim; and
   the lid comprises:
      a disk-shaped body which forms an annular contact surface which is engageable with an end of the sleeve, the contact surface defining a plane,
      a lid attachment member projecting from one side of the body and fixed to the sleeve attachment member,
      a disk-shaped seal member oriented at an angle with respect to the plane and flexibly coupled to the lid attachment member,
      a neck connecting the seal member to the body, the body, the seal member and the neck forming a recess which opens in a direction facing away from the attachment member,
   the lid being movable to a passive sealing position wherein the seal member engages an axially outwardly facing surface portion of the inner rim, and the lid being movable to an active sealing position wherein the seal member engages a radially inwardly facing surface portion of the inner rim and a portion of the inner rim is received by the recess.

3. The dust cover of claim 2, further comprising:
   a handle member which projects away from the lid and which may be grasped by an operator.

4. The dust cover of claim 3, wherein:
   the handle is positioned substantially opposite from the recess.

5. The dust cover of claim 1, wherein:
   a concave depression is formed by an outer surface of the lid.

6. The dust cover of claim 2, wherein:
   the inner rim has an annular portion which extends from the sleeve to the inner edge; and
   the inner edge of the inner rim has a partially cylindrical cross-sectional shape with an outer diameter which is larger than a thickness of said annular portion.

7. The dust cover of claim 2, wherein:
   the lid includes a flexible portion which couples the seal member to the lid attachment member.

8. The dust cover of claim 2, wherein:
   an annular recess is formed on the disk-shaped body, and on one side of the recess is joined to the lid attachment member.

9. The dust cover of claim 1, wherein:
   an annular retention rib projects from an outer surface of the sleeve, the rib being adapted for engagement with the fluid connector.

10. The dust cover of claim 1, wherein:
    the sleeve member comprises:
       an inner rim projecting radially inwardly from an axially inner end of the sleeve member, an inner edge of the inner rim forming a coupler seal,
       a circular outer rim projecting radially outwardly from said one end of the sleeve member,
       a sleeve attachment member projecting from one side of the outer rim,
       and a recess formed in an inner surface of the sleeve member opposite the sleeve attachment member; and
    the lid comprises:
       a disk-shaped body which forms an annular contact surface which is engageable with an end of the sleeve, the contact surface defining a plane, a lid attachment member projecting from one side of the body and fixed to the sleeve attachment member, a disk-shaped seal member oriented at an angle with respect to the plane and flexibly coupled to the lid attachment member, the lid being movable to a passive sealing position wherein the seal member engages an axially outer portion of the sleeve member, and the lid being movable to an active sealing position wherein a portion of the seal member is received by the recess.

11. The dust cover of claim 10, further comprising:

a handle member which projects away from the lid and which may be grasped by an operator.

12. The dust cover of claim 10, wherein:

a concave depression is formed by an outer surface of the lid.

13. The dust cover of claim 10, wherein:

the inner rim has an annular portion which extends from the sleeve to the inner edge; and the inner edge of the inner rim has a partially cylindrical cross-sectional shape with an outer diameter which is larger than a thickness of said annular portion.

14. The dust cover of claim 10, wherein:

the lid includes a flexible portion which couples the seal member to the lid attachment member.

15. The dust cover of claim 10, wherein:

a recess is formed on the disk-shaped body between the seal member and the lid attachment member.

16. The dust cover of claim 10, wherein:

an annular retention rib projects from an outer surface of the sleeve, the rib being adapted for engagement with the fluid connector.

17. A dust cover for covering an opening of a fluid connector, the dust cover comprising:

a hollow sleeve member for insertion into the connector opening, the sleeve member having an inner rim projecting radially inwardly from one end of the sleeve member, an inner edge of the inner rim forming a coupler seal; a flex member coupled to an outer end of the sleeve member; and a lid comprising:

an end attached to and integrally formed with the flex member, a disk-shaped body which forms an annular contact surface which is engageable with an end of the sleeve member, a disk-shaped seal member oriented at an angle with respect to the contact surface, and a neck connecting the seal member to the body, the body, the seal member and the neck forming a recess which opens in a direction facing away from the attached end of the lid, the lid being biased to a passive sealing position by the flex member wherein the lid engages the rim, and the lid being manually movable to an active sealing position wherein a part of the rim is releasably received by a recess formed on a part of the lid.

18. A dust cover for covering an opening of a fluid connector, the dust cover comprising:

a hollow sleeve member for insertion into the connector opening, the sleeve member having a recess formed on an inner surface thereof; a flex member coupled to an outer end of the sleeve member; and a lid comprising:

an end attached to and integrally formed with the flex member, a disk-shaped body which forms an annular contact surface which is engageable with an end of the sleeve member, a disk-shaped seal member oriented at an angle with respect to the contact surface, the lid being biased to a passive sealing position wherein the lid engages an outer portion of the sleeve member, and the lid being manually movable to an active sealing position wherein a part of the seal member rim is releasably received by the recess.

* * * * *

UNITED STATES PATENT AND TRADEMARK OFFICE
CERTIFICATE OF CORRECTION

PATENT NO. : 5,775,375
DATED : July 7, 1998
INVENTOR(S) : Norman Lee Calhoun

It is certified that error appears in the above-indentified patent and that said Letters Patent is hereby corrected as shown below:

In Claim 18, line 15, after "position" insert -- by the flex member --.

Signed and Sealed this

Twenty-third Day of March, 1999

Attest:

Q. TODD DICKINSON

*Attesting Officer*  *Acting Commissioner of Patents and Trademarks*